United States Patent
Trudelle et al.

(10) Patent No.: US 9,120,369 B2
(45) Date of Patent: Sep. 1, 2015

(54) GLASS RUN INSTALLATION TOOL

(75) Inventors: Kenneth R. Trudelle, Tecumseh, CA (US); Paul Leal, Belle River, CA (US); Kurt M. Miller, Windsor, CA (US)

(73) Assignee: FCA US LLC, Auburn Hills, MI (US)

( * ) Notice: Subject to any disclaimer, the term of this patent is extended or adjusted under 35 U.S.C. 154(b) by 925 days.

(21) Appl. No.: 13/329,760

(22) Filed: Dec. 19, 2011

(65) Prior Publication Data
US 2013/0153725 A1  Jun. 20, 2013

(51) Int. Cl.
*F16M 13/02* (2006.01)
*B62D 65/08* (2006.01)

(52) U.S. Cl.
CPC .................................. *B60J 10/0088* (2013.01)

(58) Field of Classification Search
CPC .................................................. B60J 10/0088
USPC .................... 29/235; 269/3, 6; 248/231.51
See application file for complete search history.

(56) References Cited

U.S. PATENT DOCUMENTS

| | | | | |
|---|---|---|---|---|
| 3,108,794 | A * | 10/1963 | Blatt ............................ | 269/233 |
| 4,172,313 | A * | 10/1979 | Takahashi ..................... | 29/235 |
| 4,287,658 | A * | 9/1981 | Egerer ........................... | 29/509 |
| 4,308,653 | A * | 1/1982 | Hinton et al. .................. | 29/235 |
| 4,377,893 | A * | 3/1983 | Buonanno ...................... | 29/417 |
| 4,528,736 | A * | 7/1985 | Hope et al. ..................... | 29/235 |
| 4,578,851 | A * | 4/1986 | Song ............................... | 29/235 |
| 4,620,354 | A * | 11/1986 | Hess et al. ..................... | 29/417 |
| 4,780,943 | A * | 11/1988 | St. Angelo et al. ............ | 29/235 |
| 5,103,547 | A * | 4/1992 | Holloway et al. .............. | 29/451 |
| 5,129,134 | A * | 7/1992 | St. Angelo et al. ........... | 29/281.1 |
| 5,169,081 | A * | 12/1992 | Goedderz ...................... | 242/557 |
| 5,201,106 | A * | 4/1993 | Moore et al. ............... | 29/407.05 |
| 5,237,730 | A * | 8/1993 | Goedderz ........................ | 29/235 |
| 5,237,741 | A * | 8/1993 | Goedderz ........................ | 29/819 |
| 5,619,828 | A * | 4/1997 | Ver Meer ......................... | 52/213 |
| 5,735,032 | A * | 4/1998 | Stone .............................. | 29/235 |
| 5,829,113 | A * | 11/1998 | Socci et al. ..................... | 29/451 |
| 5,855,095 | A | 1/1999 | Dedrich et al. | |
| 5,961,109 | A * | 10/1999 | Dykstra et al. ................ | 269/228 |
| 6,115,898 | A * | 9/2000 | Sawdon ........................ | 29/243.5 |
| 6,311,378 | B1 * | 11/2001 | Menguc ......................... | 29/235 |
| 6,551,316 | B1 * | 4/2003 | Rinner et al. .................. | 606/57 |
| 6,874,218 | B2 * | 4/2005 | Hicks et al. ..................... | 29/450 |
| 7,055,228 | B2 * | 6/2006 | Thommes et al. .............. | 29/235 |
| 7,152,373 | B2 | 12/2006 | Hoffman et al. | |
| 7,648,122 | B2 * | 1/2010 | Turner ................. | 254/134.3 FT |
| 7,748,094 | B2 * | 7/2010 | Yamamoto et al. ............. | 29/235 |
| 8,052,818 | B2 * | 11/2011 | Fenger .......................... | 156/160 |
| 8,146,228 | B2 * | 4/2012 | Kondo et al. ................... | 29/451 |
| 8,181,325 | B2 * | 5/2012 | Komatsu et al. ................ | 29/451 |
| 8,250,721 | B2 * | 8/2012 | Krawcheck et al. ......... | 29/243.5 |
| 8,342,483 | B1 * | 1/2013 | Manning ................. | 254/134.3 R |
| 8,408,520 | B2 * | 4/2013 | Jordan et al. .................. | 254/134 |

(Continued)

*Primary Examiner* — Lee D Wilson
*Assistant Examiner* — Mahdi H Nejad
(74) *Attorney, Agent, or Firm* — Ralph E Smith

(57) ABSTRACT

A glass run installation tool for attaching a glass run to a door frame includes at least one lower abutment member and an upper abutment member. The tool also includes a base with a first arm and a second arm. The lower abutment member is coupled to the first arm, and the upper abutment member is coupled to the second arm. The second arm is moveable relative to the first arm between a clamped position and an unclamped position. The upper abutment member and the lower abutment member clamp the glass run and the door frame together to thereby attach the glass run to the door frame when the second arm is in the clamped position.

20 Claims, 4 Drawing Sheets

(56) References Cited

U.S. PATENT DOCUMENTS

| | | | |
|---|---|---|---|
| 2002/0133929 A1* | 9/2002 | Miura et al. | 29/451 |
| 2004/0078951 A1* | 4/2004 | Cittadini et al. | 29/450 |
| 2005/0193544 A1* | 9/2005 | Supina et al. | 29/450 |
| 2006/0070224 A1* | 4/2006 | Gratien et al. | 29/451 |
| 2007/0262607 A1* | 11/2007 | Saito | 296/146.2 |
| 2008/0047119 A1* | 2/2008 | Yamamoto et al. | 29/235 |
| 2010/0101151 A1* | 4/2010 | Buse et al. | 49/493.1 |
| 2011/0308054 A1* | 12/2011 | Bednarz et al. | 29/235 |
| 2013/0205578 A1* | 8/2013 | Glikis et al. | 29/559 |

* cited by examiner

GLASS RUN INSTALLATION TOOL

FIELD

The present invention relates to a glass run of a door and, more particularly, relates to a glass run installation tool.

BACKGROUND

Door assemblies, such as vehicle door assemblies, often include a frame that defines a door header. The door header can include a glass run that receives and seals against a retractable pane of window glass. Typically, the glass run is received within a channel defined in the door header.

SUMMARY

A glass run installation tool for attaching a glass run to a door frame is disclosed. The installation tool includes at least one lower abutment member and an upper abutment member. The tool also includes a base with a first arm and a second arm. The lower abutment member is coupled to the first arm, and the upper abutment member is coupled to the second arm. The second arm is moveable relative to the first arm between a clamped position and an unclamped position. The upper abutment member and the lower abutment member clamp the glass run and the door frame together to thereby attach the glass run to the door frame when the second arm is in the clamped position.

Additionally, a glass run installation tool for attaching a glass run to a door frame is disclosed wherein the door frame includes a recess. The installation tool includes a first arm and at least one lower roller rotatingly coupled to the first arm. The tool further includes a second arm that is pivotally coupled to the first arm to move between a clamped position and an unclamped position. An upper roller is rotatingly coupled to the second arm, and the upper roller and the at least one lower roller clamp the glass run and door frame together to push the glass run into the recess when the second arm is in the clamped position. Furthermore, the tool includes a retaining member that retains the second arm in the clamped position. The upper and lower rollers are operable to roll along a longitudinal axis of the glass run and push the glass run into the recess while rolling along the longitudinal axis and while the second arm is retained in the clamped position.

Moreover, a glass run installation tool for attaching a glass run to a door header is disclosed. The door header includes an elongate recess and a projection. The installation tool includes a handle having a bottom end and a top end. The tool also includes a first arm that is fixed to the top end of the handle, and the first arm includes a first portion and a second portion. The tool further includes a first lower roller rotatingly coupled to the first portion of the first arm, and the first lower roller is rotatable about a first axis. Also, the tool includes a second lower roller rotatingly coupled to the first portion of the first arm, wherein the second lower roller is rotatable about a second axis that is disposed at a fixed acute angle relative to the first axis. The tool additionally includes a second arm with a first portion and a second portion, and the second portion of the second arm is pivotally attached to the second portion of the first arm. The second arm includes a ramp surface. Still further, an upper roller is rotatingly coupled to the first portion of the second arm, and the upper roller includes a groove that receives the projection of the door header. The tool additionally includes a lever that is rotatingly coupled to the bottom end of the handle, and the lever includes a retainer roller that rolls along the ramp surface to move the second arm from an unclamped position to a clamped position. The first and second lower rollers and the upper roller clamp the glass run and door header together and push the glass run into the recess of the door header when the second arm is in the clamped position. Furthermore, the tool includes a biasing member that biases the second arm toward the unclamped position.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
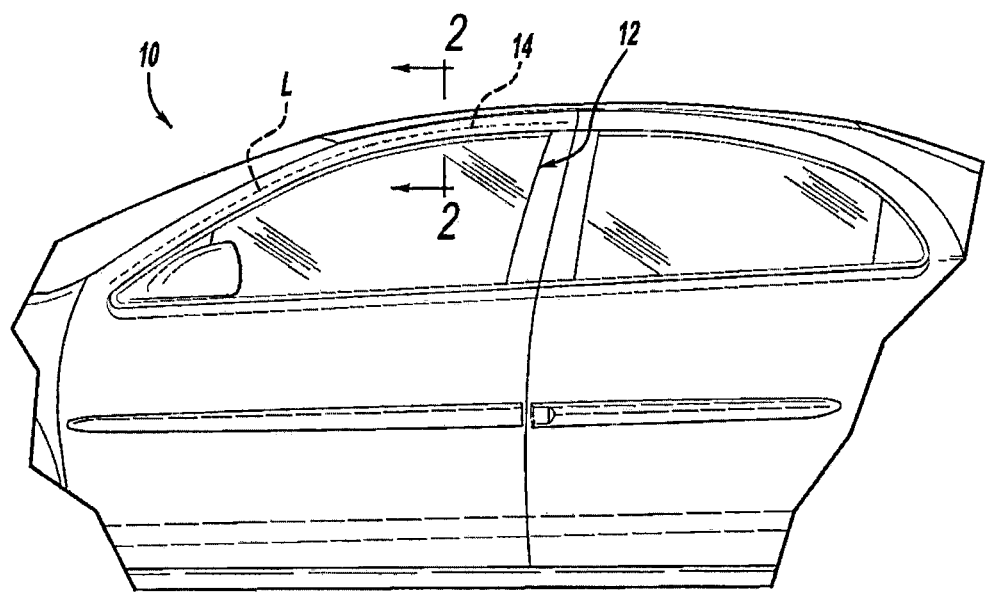
FIG. 1 is a side view of a vehicle with a door assembly.
Figure 2:
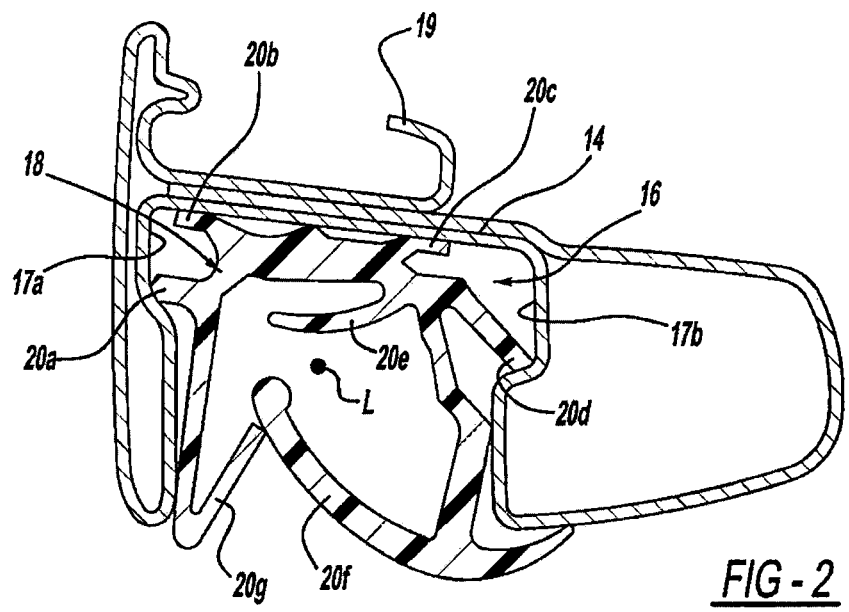
FIG. 2 is a cross sectional view a header of the door assembly taken along line 2-2 of FIG. 1, wherein a glass run is installed within the door frame.

Referring initially to FIG. 1, a vehicle 10 is illustrated. The vehicle 10 includes a door assembly 12, and the frame of the door assembly 12 can define an elongate header 14. As shown in FIG. 2, the header 14 can include a recess 16 or channel having a plurality of pockets 17a, 17b. The recess 16 can extend along a longitudinal axis L of the header 14.

As shown in FIG. 2, a glass run 18 can be received within the recess 16 of the header 14. The glass run 18 can be made of a flexible, polymeric material and can include a plurality of ribs 20a-20g that extend along the axis L. In the embodiments illustrated, ribs 20a, 20b are received within the pocket 17a of the header 14 and ribs 20c, 20d are received within the pocket 17b of the header 14 in order to retain the glass run 18 within the header 14 (i.e., in order to attach the glass run 18 and header 14 together). Other ribs 20e, 20f, 20g are configured to receive and/or seal against a pane of window glass of the door assembly 12.

A tool 22 is illustrated in FIGS. 3-6 according to various embodiments of the present teachings. As will be discussed, the tool 22 can be used to move (push) the glass run 18 into the recess 16 of the header 14 to thereby attach the glass run 18 to the header 14. It will be appreciated that the tool 22 can be used to attach the glass run 18 to another portion of the door assembly 12 other than the header 14.

Figure 3:
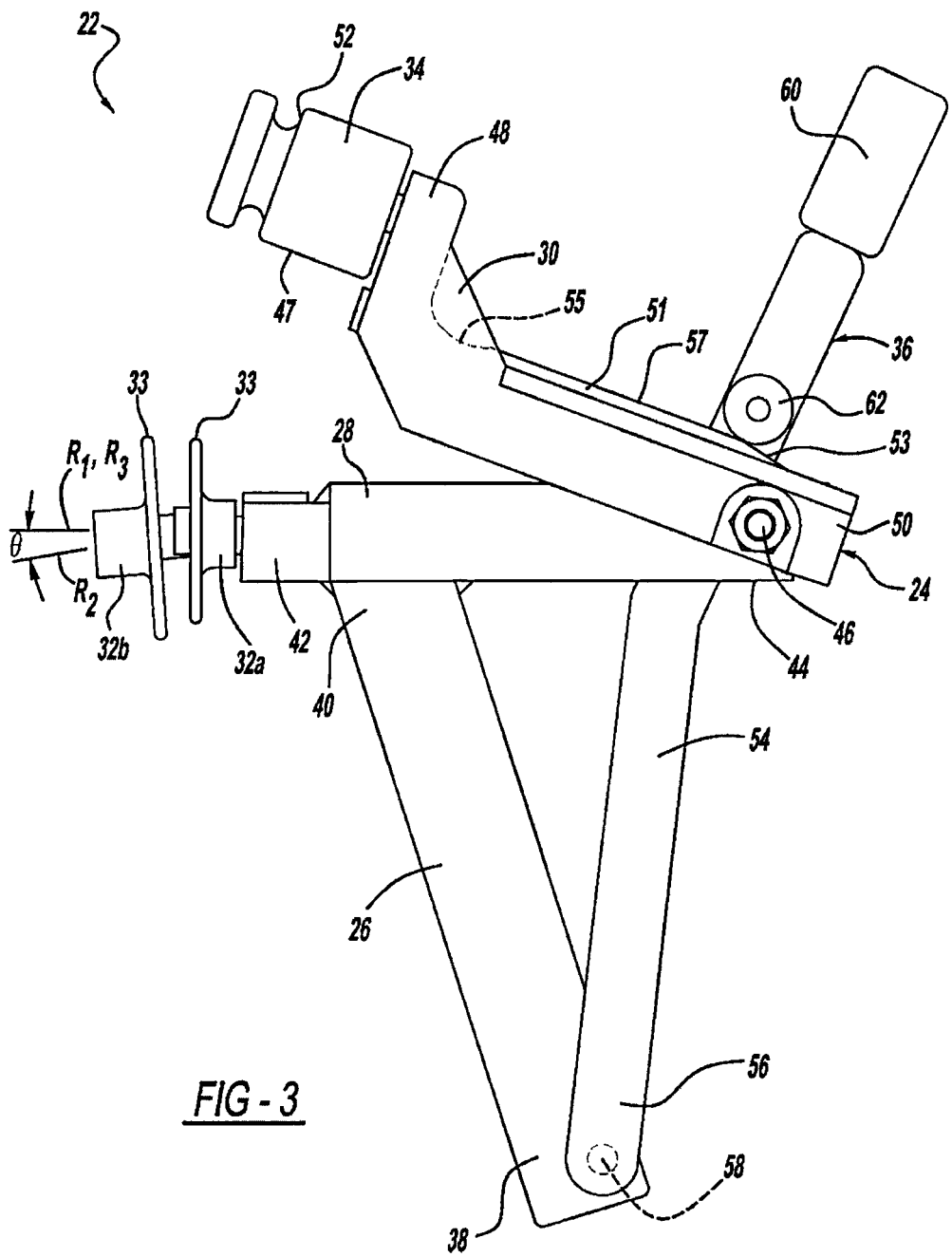
FIG. 3 is a side view of exemplary embodiments of a glass run installation tool according to the present teachings, wherein the glass run installation tool is shown in an unclamped position.
Figure 4:
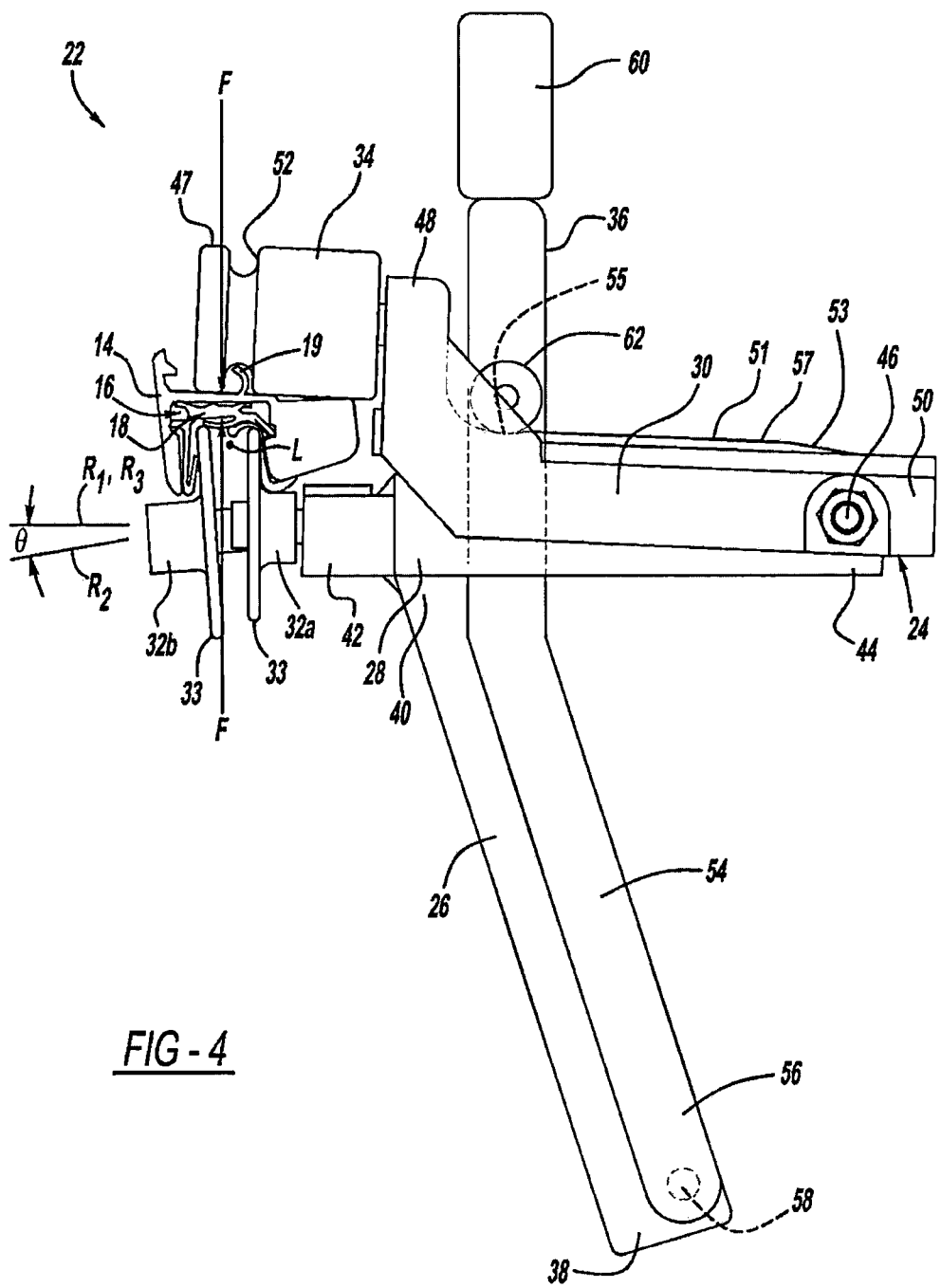
FIG. 4 is a side view of the glass run installation tool of FIG. 3, shown in a clamped position and shown during installation of the glass run into the door frame.

The tool 22 will now be discussed in greater detail with reference to FIGS. 3-6. Generally, the tool 22 can include a base 24 having a handle 26, a first arm 28, and a second arm 30. The handle 26 and the first arm 28 can be fixed together and disposed transverse relative to each other. The second arm 30 can be pivotally attached to the first arm 28 to move relative to the first arm 28 between an unclamped position (FIG. 3) and a clamped position (FIG. 4).

At least one (e.g., three) lower rollers 32a, 32b, 32c (i.e., lower abutment members) can be rotatingly coupled to the first arm 28, and an upper roller 34 (i.e., upper abutment member) can be rotatingly coupled to the second arm 30. In the clamped position, the upper and lower rollers 32a, 32b, 32c, 34 can clamp or sandwich the glass run 18 and the door header 14 together (as indicated by arrows F in FIG. 4) to thereby advance the glass run 18 into the recess 16 and to thereby attach the glass run 18 to the door header 14. In the unclamped position shown in FIG. 3, the upper and lower rollers 32a, 32b, 32c, 34 can be spaced away from each other to release the door assembly 12.

The tool 22 can further include a retainer member 36 that selectively retains the second arm 30 in the clamped position. Once the tool 22 is clamped and retained as such in one position on the longitudinal axis L, the tool 22 can be moved (rolled) along the longitudinal axis L to thereby progressively advance (push) the glass run 18 into the recess 16 of the door header 14. Accordingly, the tool 22 can significantly reduce assembly time and can improve manufacturing efficiency. Moreover, the tool 22 can have various ergonomic features to further facilitate assembly.

Individual components of the tool 22 will now be discussed in detail. The base 24 can be made of strong, rigid material, such as metal; however, the base 24 can be made out of any suitable material.

The handle 26 can be axially straight and can have a contoured (e.g., circular) cross sectional shape. The handle 26 can include a bottom end 38 and a top end 40. The first arm 28 can be fixed (e.g., welded or otherwise fastened) to the top end 40 of the handle 26. The handle 26 can extend transversely away from the first arm 28 to be generally "T" shaped.

Figure 5:
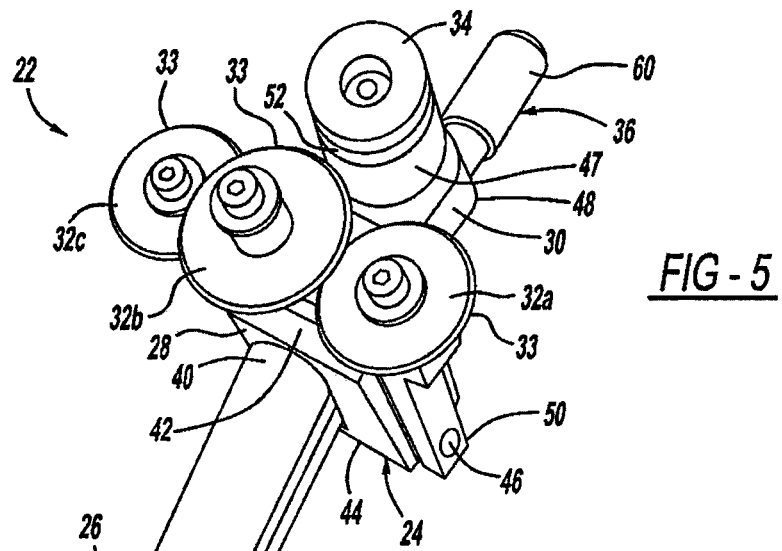
FIG. 5 is a front, isometric view of the glass run installation tool of FIG. 3.
Figure 6:
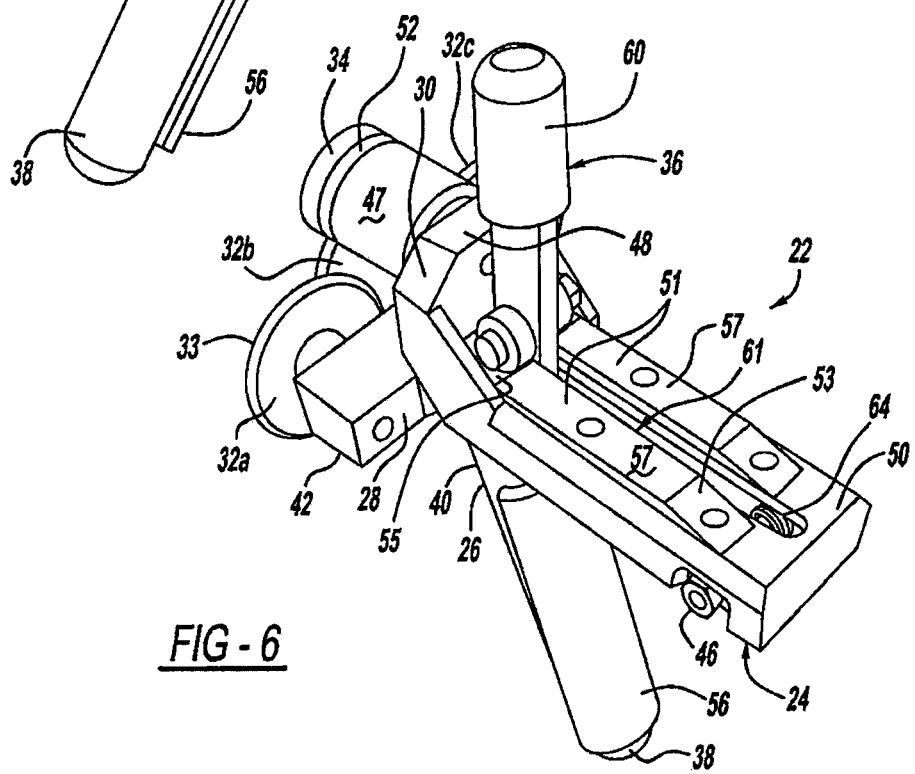
FIG. 6 is a rear, isometric view of the glass run installation tool of FIG. 3.

The first arm 28 can include a first portion 42 and a second portion 44. As shown in FIGS. 5 and 6, the first portion 42 can be block shaped, and the second portion 44 can be generally bar shaped. The first portion 42 can extend transversely relative to the second portion 44 such that the first arm 28 is generally "T" shaped.

The lower rollers 32a, 32b, 32c can be made out of any suitable material, such as nylon or other polymer. The rollers 32a, 32b, 32c can each have a relatively thin, annular edge 33 that is configured to extend into the recess 16 of the header 14 to abut against and roll along the glass run 18 during installation of the glass run 18. It will be appreciated, however, that the tool 22 can include any other features to abut against and push the glass run 18 into the door header 14. For instance, instead of rollers 32a, 32b, 32c, the tool 22 can include fixed surfaces (e.g., flanges) to abut against and slide along the glass run 18 during installation.

The rollers 32a, 32b, 32c can be arranged in a row along the first portion 42. The second lower roller 32b can be disposed between the first and third lower rollers 32a, 32c, and the second lower roller 32b can be disposed outboard relative to the first and third lower rollers 32a, 32c. The first lower rollers, 32a, 32b, 32c can rotate about rotational axes R1, R2, R3, respectively, as shown in FIGS. 3 and 4. The axes R1 and R3 can be substantially parallel to each other. The second axis R2 can be disposed at fixed acute angle θ relative to the axes R1 and R3. The axes R1, R2, R3 can be disposed at any suitable angle θ relative to each other. In some embodiments, the angle θ can be between approximately three and five degrees. Also, in some embodiments, the angle θ can be approximately four degrees. It will be appreciated that the angle θ and the relative position of the rollers 32a, 32b, 32c can be designed according to the dimensions of the glass run 18 and the door header 14 such that the rollers 32a, 32b, 32c abut and roll over the glass run 18 in an effective manner.

Still further, the second arm 30 can include a first portion 48 and a second portion 50. The first portion 48 can be block shaped with a number of flat surfaces, and the second portion 50 can be bar shaped. The first portion 48 can extend upward therefrom, away from the first arm 28. The second portion 50 of the second arm 30 can overlap the second portion 44 of the first arm 28. The second portion 50 of the second arm 30 can also be pivotally attached to the second portion 44 of the first arm 28, for instance, with a fastener 46. Thus, the second arm 30 can pivot between the clamped and unclamped positions about the fastener 46. It will be appreciated, however, that the second arm 30 can be moveably attached to the first arm 28 in any other manner. For instance, the second arm 30 can move linearly relative to the first arm 28 in some embodiments. In other embodiments, the first and second arms 28, 30 can move both pivotally and linearly relative to each other when moving between the clamped and unclamped positions.

The upper roller 34 can be made out of any suitable material, such as nylon or other polymer. The upper roller 34 can have a greater width than the lower rollers 32a, 32b, 32c. The upper roller 34 can include an outer surface 47 that is shaped according to the dimensions of the header 14 (FIG. 4). For instance, the outer surface 47 can be substantially flat, except for a groove 52 that extends about the same axis of rotation as the upper roller 34. The upper roller 34 can be rotatably attached to the first portion 48 of the second arm 30 such that the upper roller 34 can rotate relative to the second arm 30 and such that the upper roller 34 moves relative to the lower rollers 32a, 32b, 32c when the second arm 30 moves between the clamped and unclamped positions.

During installation of the glass run 18, the groove 52 can receive the projection 19 on the door header 14 such that the outer surface 47 can abut against and roll along the door header 14. It will be appreciated, however, that the tool 22 can include any other features to abut against and push against the door header 14 when installing the glass run 18. For instance, instead of the upper roller 34, the tool 22 can include a fixed surface (e.g., a flange) to abut against and slide along the door header 14 during installation.

The second arm 30 can also include one or more ramps 51. In the embodiments illustrated, the second arm 30 includes two ramps 51. Each ramp 51 can be fixed to and can extend along the second portion 50 of the second arm 30, on a side opposite the first arm 28. Each ramp 51 can include a ramp surface 57 (i.e., cam surface). The ramp surface 57 can include a tapered end 53 that tapers downward in thickness. The ramp surface 57 can also include a detent 55, such as a groove or depression. The detent 55 and the tapered end 53 can be disposed on opposite ends of the respective ramp 51. The detent 55 can be disposed adjacent the first portion 48 of the second arm 30.

The retainer member 36 can include an elongate lever 54 that is made out of strong, rigid material (e.g., aluminum or steel). The lever 54 can include a bottom end 56 that is pivotally attached to the bottom end 38 of the handle 26. The lever 54 and handle 26 can be pivotally attached, for instance, by a bolt or other fastener 58. The bottom end 56 can be contoured such that the bottom end 56 can partially wrap around the handle 26 as shown in FIG. 6. The lever 54 can also include a top end 60.

As shown in FIG. 6, the lever 54 can extend through and move within an opening 61 that is defined in both the first and second arms 28, 30. For instance, the opening 61 can be an elongate groove formed in both the first and second arms 28, 30. Thus, the lever 54 can pivot relative to the handle 26, the first arm 28, and the second arm 30, and the lever 54 can move within the opening 61 as the second arm 30 moves between the clamped and unclamped positions.

The retainer member 36 can also include one or more (e.g., two) retainer rollers 62. The rollers 62 can be rotationally coupled on opposite sides of the lever 54 and can be disposed so as to roll along the respective ramp surfaces 57.

The tool 22 can further include biasing member 64 (FIG. 6). The biasing member 64 can be of any suitable type, such as a torsion spring. The biasing member 64 can be disposed (e.g., helically wound) about the fastener 46 such that the biasing member 64 biases the second arm 30 away from the first arm 28. As such, the biasing member 64 can bias the second arm 30 toward the unclamped position.

Accordingly, to move the tool 22 from the unclamped position (FIG. 3) to the clamped position (FIG. 4), the user can squeeze (with one hand) the handle 26 and the bottom end 56 of the lever 54 while pushing the top end 60 of the lever 54 (with the other hand) toward the first portion 42 of the first arm 28. The retainer rollers 62 will thus roll up the tapered end 53 and push on the ramp 51 to push the second arm 30 downward toward the first arm 28. Eventually, the retainer rollers 62 will come to rest in the detents 55 to thereby lock and retain the tool 22 in the clamped position. As shown in FIG. 4, the upper roller 34 can clamp down on the header 14, and the lower rollers 32a, 32b, 32c can clamp up on the glass run 18 (indicated with arrows F), and this combined clamping force F can push the glass run 18 into the recess 16. The retainer member 36 can keep the tool 22 in the clamped position, and the tool 22 can be advanced along the axis L to progressively push the remaining portion of the glass run 18 into the door header 14.

Then, to move the tool 22 from the clamped position (FIG. 4) to the unclamped position (FIG. 3), the user can pull the top end 60 of the lever 54 away from the first portion 48 of the second arm 30. The retainer rollers 62 will eventually roll down the tapered ends 53 of the ramps 51, releasing the second arm 30, and the biasing member 64 will push the second arm 30 away from the first arm 28 such that the door assembly 12 can be released.

It will be appreciated that the tool 22 can be varied in a number of ways. For instance, in the embodiments illustrated, when moving to the clamped position, lever 54 moves toward the handle 26 to move the first and second arms 28, 30 toward each other. In other embodiments, the lever 54 could be attached such that the lever 54 is moved away from the handle 26 to move the first and second arms 28, 30 toward each other.

Also, the retainer member 36 could be embodied in other ways. For instance, the retainer member 36 could be separate from the base 24, and once the first and second arms 28, 30 are in the clamped position, the retainer member 36 could be attached to retain the arms 28, 30 in position.

Moreover, in some embodiments, the tool 22 does not include a retainer member 36. Instead, the user squeezes the arms 28, 30 to the clamped position and keeps manually squeezing until the installation is complete.

In summary, the tool 22 allows the glass run 18 to be installed into the door header 14 in a very convenient manner. The clamping force F applied by the tool 22 can be substantially consistent for installing different glass runs 18 in different door headers 14, such that the installation process can be highly repeatable, and proper installation of each glass run 18 can be ensured. Also, the tool 22 is highly ergonomic such that installation can be completed comfortably by a single worker.

What is claimed is:

1. A glass run installation tool for attaching a glass run to a door frame comprising:
    at least a pair of parallel lower rollers;
    an upper roller; and
    a base with a first arm and a second arm, the pair of lower rollers coupled to the first arm, the upper roller coupled to the second arm, the second arm moveable relative to the first arm between a clamped position and an unclamped position, the upper roller and the pair of lower rollers clamping the glass run and the door frame together to thereby attach the glass run to the door frame when the second arm is in the clamped position.

2. The glass run installation tool of claim 1, further comprising a retaining member that retains the second arm in the clamped position.

3. The glass run installation tool of claim 1, wherein the upper roller is rotatingly attached to the base, the upper roller operable to rotate along a longitudinal axis of the glass run while the second arm is in the clamped position, the upper roller progressively attaching the glass run to the door frame while rolling along the longitudinal axis.

4. The glass run installation tool of claim 3, wherein the the upper roller includes a groove that receives a projection of the frame.

5. The glass run installation tool of claim 3, wherein the pair of lower rollers includes a first lower roller and a second lower roller, the first lower roller rotatable about a first axis of rotation, the second lower roller rotatable about a second axis of rotation, the first and second axes of rotation disposed at an acute angle relative to each other.

6. The glass run installation tool of claim 5, wherein the acute angle is a fixed angle.

7. The glass run installation tool of claim 1, wherein the base further includes a handle, the handle including a top end that is fixed to the first arm.

8. The glass run installation tool of claim 1, wherein the first arm includes a first portion and a second portion, the pair of lower rollers coupled to the first portion of the first arm, the second arm pivotally coupled to the second portion of the first arm.

9. The glass run installation tool of claim 8, further comprising a retaining member that retains the second arm in the clamped position, wherein the handle includes a bottom end, wherein the retaining member includes a lever that is pivotally coupled to the handle adjacent the bottom end, the lever moveable relative to the base to retain the second arm in the clamped position.

10. The glass run installation tool of claim 9, wherein an opening is defined through both the first arm and the second arm, the lever extending through the opening and moveable within the opening to retain the second arm in the clamped position.

11. The glass run installation tool of claim 9, wherein the second arm includes a ramp, wherein the lever includes a roller that rolls on the ramp when moving relative to the handle to thereby move the second arm between the clamped and unclamped positions.

12. The glass run installation tool of claim 9, wherein the handle and the lever are squeezable with a single hand to move the second arm from the unclamped position to the clamped position.

13. The glass run installation tool of claim 1, further comprising a biasing member that biases the second arm toward the unclamped position.

14. A glass run installation tool for attaching a glass run to a door frame, the door frame including a recess, the installation tool comprising:
- a first arm;
- a first lower roller, a second lower roller, and a third lower roller each being arranged in parallel and rotatingly coupled to the first arm;
- a second arm that is pivotally coupled to the first arm to move between a clamped position and an unclamped position;
- an upper roller rotatingly coupled to the second arm, the upper roller and the at first, second, and third lower rollers clamping the glass run and door frame together to push the glass run into the recess when the second arm is in the clamped position; and
- a retaining member that retains the second arm in the clamped position, the upper and lower rollers operable to roll along a longitudinal axis of the glass run and push the glass run into the recess while rolling along the longitudinal axis and while the second arm is retained in the clamped position.

15. The glass run installation tool of claim 14, wherein the first and second lower rollers rotate about a first axis and a second axis, and the third lower roller rotates about a third axis, the third axis disposed at an acute angle relative to each of the first and second axes.

16. The glass run installation tool of claim 14, wherein the upper roller includes a groove that receives a projection of the door frame.

17. The glass run installation tool of claim 14, further comprising a handle that is fixed to the first arm, the retaining member including a lever that is pivotally coupled to the handle.

18. The glass run installation tool of claim 17, wherein the second arm includes a ramp surface and the lever includes a retainer roller that rolls on the ramp surface to move the second arm between the clamped and unclamped position.

19. The glass run installation tool of claim 18, further comprising a biasing member that biases the second arm away toward the unclamped position.

20. A glass run installation tool for attaching a glass run to a door header, the door header including an elongate recess and a projection, the installation tool comprising:
- a handle having a bottom end and a top end;
- a first arm that is fixed to the top end of the handle, the first arm including a first portion and a second portion;
- a first lower roller rotatingly coupled to the first portion of the first arm, the first lower roller rotatable about a first axis;
- a second lower roller rotatingly coupled to the first portion of the first arm, the second lower roller being arranged in parallel with the first lower roller, and the second lower roller being rotatable about a second axis that is disposed at a fixed acute angle relative to the first axis;
- a second arm with a first portion and a second portion, the second portion of the second arm being pivotally attached to the second portion of the first arm, the second arm including a ramp surface;
- an upper roller that is rotatingly coupled to the first portion of the second arm, the upper roller including a groove that receives the projection of the door header;
- a lever that is rotatingly coupled to the bottom end of the handle, the lever including a retainer roller that rolls along the ramp surface to move the second arm from an unclamped position to a clamped position, the first and second lower rollers and the upper roller clamping the glass run and door header together and pushing the glass run into the recess of the door header when the second arm is in the clamped position; and
- a biasing member that biases the second arm toward the unclamped position.

* * * * *